(12) United States Patent
Hirvimies et al.

(10) Patent No.: US 11,455,399 B2
(45) Date of Patent: Sep. 27, 2022

(54) ELECTRONIC DEVICE, SOFTWARE PROVISIONING SERVER AND METHODS THEREOF

(71) Applicant: Huawei Technologies Co., Ltd., Shenzhen (CN)

(72) Inventors: Janne Hirvimies, Helsinki (FI); Sampo Sovio, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 545 days.

(21) Appl. No.: 16/415,939

(22) Filed: May 17, 2019

(65) Prior Publication Data

US 2019/0272378 A1 Sep. 5, 2019

Related U.S. Application Data

(63) Continuation of application No. PCT/EP2016/077998, filed on Nov. 17, 2016.

(51) Int. Cl.
*G06F 21/57* (2013.01)
*G06F 8/65* (2018.01)
(Continued)

(52) U.S. Cl.
CPC .............. *G06F 21/577* (2013.01); *G06F 8/65* (2013.01); *G06F 8/71* (2013.01); *G06F 21/57* (2013.01);
(Continued)

(58) Field of Classification Search
CPC . G06F 21/577; G06F 8/65; G06F 8/71; G06F 21/57; G06F 2221/033; H04L 9/006; H04L 9/14; H04L 67/34
See application file for complete search history.

(56) References Cited

U.S. PATENT DOCUMENTS

| 8,745,612 B1* | 6/2014 | Semenzato | G06F 8/65 |
| | | | 717/170 |
| 2003/0233648 A1* | 12/2003 | Earl | G06F 8/65 |
| | | | 717/176 |

(Continued)

FOREIGN PATENT DOCUMENTS

| CN | 101969440 A | 2/2011 |
| CN | 102868731 A | 1/2013 |

(Continued)

*Primary Examiner* — Theodore C Parsons
*Assistant Examiner* — Howard H. Louie
(74) *Attorney, Agent, or Firm* — Leydig, Voit & Mayer, Ltd.

(57) ABSTRACT

An electronic device and a software provisioning server are provided. The electronic device is configured to obey an Anti-Roll Back (ARB) enforcement policy, obtain an ARB exception associated with a software, wherein the ARB exception comprises a signature of the ARB exception and a revision number of the software, check the validity of the signature of the ARB exception, and execute the software having the revision number so as to overrun the ARB enforcement policy if the signature of the ARB exception is valid. The software provisioning server is configured to determine an ARB exception associated with a software for overrunning an ARB enforcement policy in an electronic device, wherein the ARB exception comprises a signature of the ARB exception and a revision number of the software, provide the ARB exception to the electronic device.

20 Claims, 4 Drawing Sheets

(51) Int. Cl.
*G06F 8/71* (2018.01)
*H04L 9/14* (2006.01)
*H04L 9/00* (2022.01)
*H04L 67/00* (2022.01)

(52) U.S. Cl.
CPC ............... *H04L 9/006* (2013.01); *H04L 9/14* (2013.01); *H04L 67/34* (2013.01); *G06F 2221/033* (2013.01)

(56) References Cited

U.S. PATENT DOCUMENTS

| | | | |
|---|---|---|---|
| 2008/0195868 A1* | 8/2008 | Asokan | G06F 21/64 713/176 |
| 2008/0244556 A1 | 10/2008 | Plante et al. | |
| 2014/0004825 A1 | 1/2014 | Prakash et al. | |
| 2014/0130151 A1 | 5/2014 | Krishnamurthy et al. | |
| 2014/0250290 A1 | 9/2014 | Støhl et al. | |
| 2017/0228558 A1* | 8/2017 | Le Rudulier | G06F 21/57 |

FOREIGN PATENT DOCUMENTS

| | | |
|---|---|---|
| CN | 104956374 A | 9/2015 |
| WO | 2014131652 A1 | 9/2014 |

\* cited by examiner

ELECTRONIC DEVICE, SOFTWARE PROVISIONING SERVER AND METHODS THEREOF

CROSS-REFERENCE TO RELATED APPLICATIONS

This application is a continuation of International Application No. PCT/EP2016/077998 filed on Nov. 17, 2016, the disclosure of which is hereby incorporated by reference in its entirety.

TECHNICAL FIELD

Embodiments of the invention relate to an electronic device and a software provisioning server. Furthermore, embodiments of the invention also relate to corresponding methods, a computer program, and a computer program product.

BACKGROUND

Electronic devices running software (SW) are ubiquitous part of our everyday life. As these devices are connected and accessible remotely a fundamental issue with these devices is security. Within the scope of SW security, a key question is how to patch the SW after a vulnerability has been identified and also to prevent the usage of old vulnerable SW.

A typical solution to address these SW security issues is to use a SW Anti-Roll Back (ARB) mechanism obeying an ARB enforcement policy, also known as SW downgrade prevention. The ARB mechanism performs a check of SW components on an electronic device, typically as part of the verifications performed during secure boot. Said check prevents an older version of a SW component, which for example contains a security bug, from being reinstalled and executed on an electronic device when a newer version of that SW component, in which the bug was corrected, has been installed. For SW ARB purposes, it is common to give a SW component a security revision number that is increased only when a security-sensitive bug is corrected.

For each SW component, the highest security revision number that has been installed on the device must be stored on the device. This can be done in many ways. One typical technique is to have a so called digitally signed version table covering the ARB protected SW components, i.e. an ARB table. The ARB table defines the versions of the SW components that are allowed to be executed by storing the security revision numbers of the SW components. The ARB table is then bound to a one-time programmable (OTP) memory of a device. Each time a security revision number is increased, a fuse is burnt (i.e. an OTP bit flipped) to increase the stored security revision number. SW components are then checked against the ARB table and the ARB table itself is checked against the OTP value prior to loading and execution.

A more cost efficient conventional solution is to keep an ARB table containing the highest security revisions for each protected SW component that has been installed on the device in a non-volatile storage, such as an embedded MultiMediaCard (eMMC) memory.

Although ARB mechanisms are successful in preventing the use of old, vulnerable SW versions they can cause excessive logistical burden on the SW distribution process.

SUMMARY

An objective of embodiments of the invention is to provide a solution which mitigates or solves the drawbacks and problems with conventional solutions.

An "or" in this description and the corresponding claims is to be understood as a mathematical OR which covers "and" and "or", and is not to be understand as an XOR (exclusive OR).

The above and further objectives are solved by the subject matter of the independent claims. Further advantageous implementation forms of the invention can be found in the dependent claims.

According to a first aspect of the invention, the above mentioned and other objectives are achieved with an electronic device configured to obey an Anti-Roll Back, ARB, enforcement policy, obtain an ARB exception associated with a software, wherein the ARB exception comprises a signature of the ARB exception and a revision number of the software, check the validity of the signature of the ARB exception, and execute the software having the revision number so as to overrun the ARB enforcement policy if the signature of the ARB exception is valid.

The electronic device according to the first aspect provides a number of advantages over conventional solutions. One such advantage is that the electronic device is given the permission to overrun an ARB enforcement policy and roll back to a previous SW version, e.g. in a situation where a new SW version causes problems. The ARB exception provides a controlled and secure roll back based on the revision number and the signature of the ARB exception. The revision number controls which SW versions the electronic device is allowed to roll back to. Further, the signature ensures that the electronic device only performs ARB exception originating from a trusted party. Thereby, high security when handling exceptions to an ARB enforcement policy is provided.

In a first possible implementation form of an electronic device according to the first aspect, the ARB exception further comprises an identity of the software, and the electronic device is further configured to identify the software having the revision number to be executed based on the identity of the software.

The identity of the SW is used to simplify the identification of the SW associated with the ARB exception.

In a second possible implementation form of an electronic device according to the first implementation form of the first aspect or to the first aspect as such, the revision number is a minimum revision number, and the electronic device is further configured to execute the software having the minimum revision number or a higher revision number if the signature of the ARB exception is valid.

The second implementation form provides the flexibility to allow a roll back to more than one SW version but still ensures that the executed SW version has a securely verified revision number.

In a third possible implementation form of an electronic device according to any of the preceding implementation forms of the first aspect or to the first aspect as such, the electronic device is further configured to obtain a first key associated with the signature of the ARB exception, check the validity of the signature of the ARB exception using the first key.

The third implementation form provides validation of the ARB exception with a signature scheme which allows the electronic device to check if the ARB exceptions originates from a trusted party. The signature scheme is based on a first key which can be a private key or a public key.

In a fourth possible implementation form of an electronic device according to any of the preceding implementation forms of the first aspect or to the first aspect as such, the ARB exception further comprises a second key associated with the software, and the electronic device is further configured to check the validity of a signature of the software using the second key, execute the software having the revision number so as to overrun the ARB enforcement policy if the signature of the ARB exception is valid and the signature of the software is valid.

The fourth implementation form provides increased security. By having a signature scheme also for the SW it is possible to control which parties are allowed to create SW installation packages, e.g. only allow certain trusted parties to create such installation packages. The signature scheme for the SW is based on a second key which can be a private key or a public key.

In a fifth possible implementation form of an electronic device according to any of the preceding implementation forms of the first aspect or to the first aspect as such, the revision number is a lower revision number than a current revision number of the software already installed in the electronic device.

In scenarios where an old SW version provides better performance or functionality for an electronic device it is beneficial to allow the roll back to the old SW version.

In a sixth possible implementation form of an electronic device according to any of the preceding implementation forms of the first aspect or to the first aspect as such, the electronic device is further configured to install or run the software so as to execute the software having the revision number.

The sixth implementation form provides the actual execution of the roll back which may be to install the SW or to run the SW.

In a seventh possible implementation form of an electronic device according to any of the preceding implementation forms of the first aspect or to the first aspect as such, the electronic device is further configured to transmit a ARB exception request associated with the software to a software provisioning server, receive the ARB exception from the software provisioning server in response to the transmission of the ARB exception request to the software provisioning server.

It is important that the electronic device has access to valid ARB exceptions. The seventh implementation form provides a mechanism for the electronic device to actively request an ARB exception, e.g. in case of an unexpected problem with a SW version.

In an eighth possible implementation form of an electronic device according to any of the preceding implementation forms of the first aspect or to the first aspect as such, the electronic device is further configured to receive the ARB exception in a software bundle comprising the software.

In scenarios where it is known that a ARB enforcement policy will prevent the execution of a particular SW version it is beneficial to provide the ARB exception in the same bundle as said SW version.

According to a second aspect of the invention, the above mentioned and other objectives are achieved with a software provisioning server configured to determine an ARB exception associated with a software for overrunning a ARB enforcement policy in an electronic device, wherein the ARB exception comprises a signature of the ARB exception and a revision number of the software, provide the ARB exception to the electronic device.

The software provisioning server according to the second aspect provides a number of advantages over conventional solutions. One such advantage is that the software provisioning server can give an electronic device permission to overrun an ARB enforcement policy and roll back to a previous SW version, e.g. in a situation where a new SW version causes problems. The software provisioning server controls the roll back with the ARB exception which comprises the revision number of the SW that the electronic device is allowed to roll back to. The signature of the ARB exception ensures that the electronic device only performs exception originating from a trusted party. Thereby, high security when handling exceptions to an ARB enforcement policy is provided.

In a first possible implementation form of a software provisioning server according to the second aspect, the software provisioning server is further configured to determine a delegate ARB exception associated with a software, wherein the delegate ARB exception comprises a signature of the delegate ARB exception, a delegate policy for ARB exception, and a revision number of the software, transmit the delegate ARB exception to another software provisioning server.

The first implementation form provides additional flexibility by allowing a root trusted party (in this case the software provisioning server) to give permission to a delegate party (in this case the another software provisioning server) to determine an ARB exception based on the delegate ARB exception. The delegate policy describes what kind of ARB enforcement policies the delegate party is allowed to determine.

In a second possible implementation form of a software provisioning server according to the first possible implementation form of the second aspect or to the second aspect as such, the software provisioning server is further configured to receive a delegate ARB exception associated with a software from another software provisioning server, wherein the delegate ARB exception comprises a signature of the delegate ARB exception, a delegate policy for ARB exception, and a revision number of the software, check the validity of the signature of the delegate ARB exception, determine an ARB exception associated with the software based on the delegate policy for ARB exception and the revision number of the software if the signature of the delegate ARB exception is valid.

A software provisioning server acting as a delegate party is allowed to determine an ARB exception based on a delegate ARB exception if the delegate ARB exception is found to be valid, i.e. it is ensured that the delegate ARB exception originates from a trusted party.

In a third possible implementation form of a software provisioning server according to the second possible implementation form of the second aspect, the software provisioning server is further configured to receive a third key associated with the delegate ARB exception from the another software provisioning server, check the validity of the signature of the delegate ARB exception using the third key.

The third implementation form provides validation of the delegate ARB exception with a signature scheme. The signature scheme is based on a third key which can be a private key or a public key.

In a fourth possible implementation form of a software provisioning server according to any of the preceding implementation forms of the second aspect or to the second aspect as such, the software provisioning server is further configured to receive a ARB exception request associated with the software from the electronic device, transmit the ARB exception to the electronic device in response to the reception of the ARB exception request from the electronic device.

The fourth implementation form provides a mechanism to provide an ARB exception upon a request from an electronic device.

According to a third aspect of the invention, the above mentioned and other objectives are achieved with a method for an electronic device, the method comprises obeying an Anti-Roll Back, ARB, enforcement policy, obtaining an ARB exception associated with a software, wherein the ARB exception comprises a signature of the ARB exception and a revision number of the software, checking the validity of the signature of the ARB exception, and executing the software having the revision number so as to overrun the ARB enforcement policy if the signature of the ARB exception is valid.

In a first possible implementation form of a method according to the third aspect, the ARB exception further comprises an identity of the software, and the method further comprises identifying the software having the revision number to be executed based on the identity of the software.

In a second possible implementation form of a method according to the first implementation form of the third aspect or to the third aspect as such, the revision number is a minimum revision number, and the method further comprises executing the software having the minimum revision number or a higher revision number if the signature of the ARB exception is valid.

In a third possible implementation form of a method according to any of the preceding implementation form of the third aspect or to the third aspect as such, the method further comprises obtaining a first key associated with the signature of the ARB exception, checking the validity of the signature of the ARB exception using the first key.

In a fourth possible implementation form of a method according to any of the preceding implementation forms of the third aspect or to the third aspect as such, the ARB exception further comprises a second key associated with the software, and the method further comprises checking the validity of a signature of the software using the second key, executing the software having the revision number so as to overrun the ARB enforcement policy if the signature of the ARB exception is valid and the signature of the software is valid.

In a fifth possible implementation form of a method according to any of the preceding implementation forms of the third aspect or to the third aspect as such, the revision number is a lower revision number than a current revision number of the software already installed in the electronic device.

In a sixth possible implementation form of a method according to any of the preceding implementation forms of the third aspect or to the third aspect as such, the method further comprises installing or running the software so as to execute the software having the revision number.

In a seventh possible implementation form of a method according to any of the preceding implementation forms of the third aspect or to the third aspect as such, the method further comprises transmitting a ARB exception request associated with the software to a software provisioning server, receiving the ARB exception from the software provisioning server in response to the transmission of the ARB exception request to the software provisioning server.

In an eighth possible implementation form of a method according to any of the preceding implementation forms of the third aspect or to the third aspect as such, the method further comprises receiving the ARB exception in a software bundle comprising the software.

The advantages of any method according to the third aspect are the same as those for the corresponding electronic device claims according to the first aspects.

According to a fourth aspect of the invention, the above mentioned and other objectives are achieved with a method for a software provisioning server, the method comprises determining an ARB exception associated with a software for overrunning a ARB enforcement policy in an electronic device, wherein the ARB exception comprises a signature of the ARB exception and a revision number of the software, providing the ARB exception to the electronic device.

In a first possible implementation form of a method according to the fourth aspect, the method further comprises determining a delegate ARB exception associated with a software, wherein the delegate ARB exception comprises a signature of the delegate ARB exception, a delegate policy for ARB exception, and a revision number of the software, transmitting the delegate ARB exception to another software provisioning server.

In a second possible implementation form of a method according to the first possible implementation form of the fourth aspect or to the fourth aspect as such, the method further comprises receiving a delegate ARB exception associated with a software from another software provisioning server, wherein the delegate ARB exception comprises a signature of the delegate ARB exception, a delegate policy for ARB exception, and a revision number of the software, checking the validity of the signature of the delegate ARB exception, determining an ARB exception associated with the software based on the delegate policy for ARB exception and the revision number of the software if the signature of the delegate ARB exception is valid.

In a third possible implementation form of a method according to the second possible implementation form of the fourth aspect, the method further comprises receiving a third key associated with the delegate ARB exception from the another software provisioning server, checking the validity of the signature of the delegate ARB exception using the third key.

In a fourth possible implementation form of a method according to any of the preceding implementation forms of the fourth aspect or to the fourth aspect as such, the method further comprises receiving a ARB exception request associated with the software from the electronic device, transmitting the ARB exception to the electronic device in response to the reception of the ARB exception request from the electronic device.

The advantages of any method according to the fourth aspect are the same as those for the corresponding software provisioning server claims according to the second aspects.

The invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

ARB protection mechanisms are designed to block installations of old SW versions with the use of ARB enforcement policies. Preventing such installations are crucial to block security vulnerabilities of older SW versions. Otherwise attackers could simply reinstall an older SW version to exploit the security vulnerabilities. At the same time, there are scenarios where a roll back to an older SW version is necessary and justified, e.g. when a new SW version does not work as desired on specific electronic devices. A typical scenario is that certain hardware specific configurations have not been implemented properly and the new SW version will therefore not work on some electronic device models. In such a scenario, there is a clear need to install an older working SW version on those electronic device models, but at the same time necessary to still prevent attackers from rolling back to the older, possibly vulnerable, SW version.

Therefore, embodiments of the invention relate to a secure authorization mechanism that enables a controlled roll back to an older SW version. An authorized party is allowed to overrun an ARB enforcement policy, which would otherwise prevent execution such as installation and/or loading of the older SW version.

The concept of ARB exceptions is herein introduced. ARB exceptions can be understood as generic security policies or rules that specify exceptions to ARB enforcement policies. The ARB exception rules define which party is allowed to do what in relation to loading and/or installing different SW versions. In order to maintain high security these rules must be approved by a trustworthy authority. More precisely an ARB exception could be a digital piece of data containing rules about which SW versions a party is allowed to roll back to, i.e. downgrade to. The ARB exception is signed by a trusted party, e.g. an Original Equipment Manufacturer (OEM). When a SW version is attempted to be loaded or installed and an error message is received due to the violation of an ARB enforcement policy, the SW loader or installer can check whether a valid ARB exception is present or not. If a valid ARB exception is present, the exception is allowed and the SW will be loaded or installed (executed in general).

Figure 1:
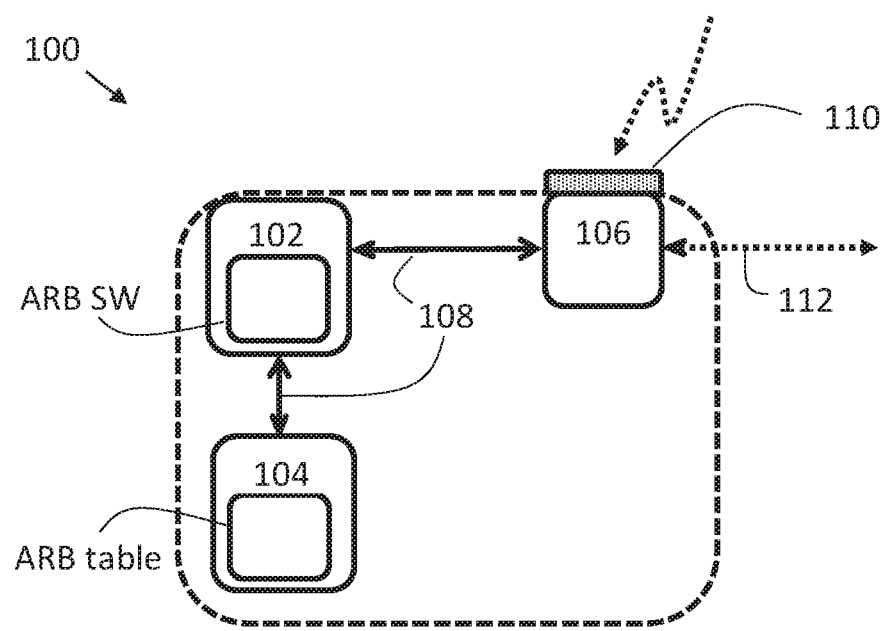
FIG. 1 shows an electronic device according to an embodiment of the invention.

According to an embodiment of the invention the authorization mechanism that enables an ARB enforcement policy to be overrun is performed by an electronic device 100, such as the one shown in FIG. 1. The electronic device 100 comprises a processor 102 coupled to a memory 104 and a transceiver 106. The processor 102 and the memory 104, as well as the processor 102 and the transceiver 106, are coupled to each other by means of communication means 108 known in the art. The processor 102 comprises a ARB mechanism configured to obey an ARB enforcement policy, i.e. to enforce ARB policies, which can be implemented either in hardware (HW), in SW, or in a combination of HW and SW.

As an example, the ARB mechanism can be implemented as a computer program that runs as a background process, e.g. a daemon, which is constantly monitoring if someone is trying to execute a SW. If the SW is attempted to be executed the daemon intercepts the execution of the SW to check that no ARB enforcement policy is violated by the execution. An ARB enforcement policy is violated if the revision number of the SW to be executed is lower than the revision number specified by the ARB enforcement policy. The ARB enforcement policies are generally stored in a database called an ARB table, which is implemented in the memory 104. Hence, the memory 104 of the electronic device 100 comprises such an ARB table defining which SW versions are allowed to be executed. The electronic device 100 can be configured for both wireless and wired communications in wireless and wired communication systems, respectively. The wireless communication capability is provided with an antenna 110 coupled to the transceiver 106, while the wired communication capability is provided with a wired communication interface 112 coupled to the transceiver 106.

The electronic device 100 in FIG. 1 is configured to obey an ARB enforcement policy. The electronic device 100 is further configured to obtain an ARB exception associated with a software SW. The ARB exception comprises a signature of the ARB exception and a revision number RN of the SW. The electronic device 100 is further configured to check the validity of the signature of the ARB exception, and execute the SW having the revision number RN so as to overrun the ARB enforcement policy if the signature of the ARB exception is valid. On the other hand, if the signature is found to be not valid, then the electronic device 100 will follow the ARB enforcement policy and block the execution of the software. The processor 102 and the memory 104 of the electronic device 100 may together be configured to perform the present solution.

The electronic device 100 is any electronic device configured to obey an ARB enforcement policy. In one example, the electronic device 100 further has electronic communication capabilities. The electronic device 100 herein may e.g. be a client device, a wireless router, a network server, a laptop, a desktop computer, or any other suitable communication devices. A client device may further be referred to as a user device, a User Equipment (UE), a mobile station, an internet of things (IoT) device, a sensor device, a wireless terminal and/or a mobile terminal, or a computer tablet.

Figure 2:
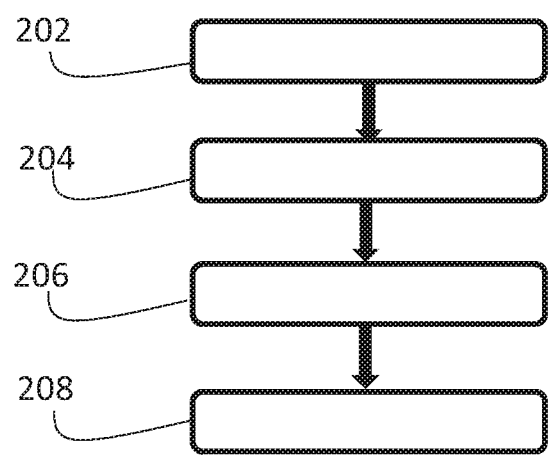
FIG. 2 shows a method for the electronic device according to an embodiment of the invention.

FIG. 2 shows a flow chart of a corresponding method 200 which may be executed in an electronic device 100, such as the one shown in FIG. 1. The method 200 comprises obeying 202 an ARB enforcement policy. The method 200 further comprises obtaining 204 an ARB exception associated with an SW. The ARB exception comprises a signature of the ARB exception and a revision number RN of the SW. The method 200 further comprises checking 206 the validity of the signature of the ARB exception, and executing 208 the SW having the revision number RN so as to overrun the ARB enforcement policy if the signature of the ARB exception is valid.

In one embodiment, the ARB exception further comprises an identity of the SW. The electronic device 100 uses the identity of the SW, obtained from the ARB exception, to identify the SW having the revision number RN to be executed. The identity of the SW can e.g. be the hash of the SW. Another option is to use metadata associated with the SW as the identity of the SW.

As described above, the electronic device 100 also obtains the revision number RN of the SW from the ARB exception. The revision number RN comprised in the ARB exception is in one embodiment the minimum allowed revision number for a specific SW. Thereby, meaning that, if the ARB exception is found to be valid, the electronic device 100 is allowed to execute the SW with the minimum revision number specified in the ARB exception but also allowed to execute the SW with a revision number that is higher than the minimum revision number. In a typical scenario, the revision number RN of the ARB exception is a lower revision number than a current revision number of the SW already installed in the electronic device 100.

Figure 3:
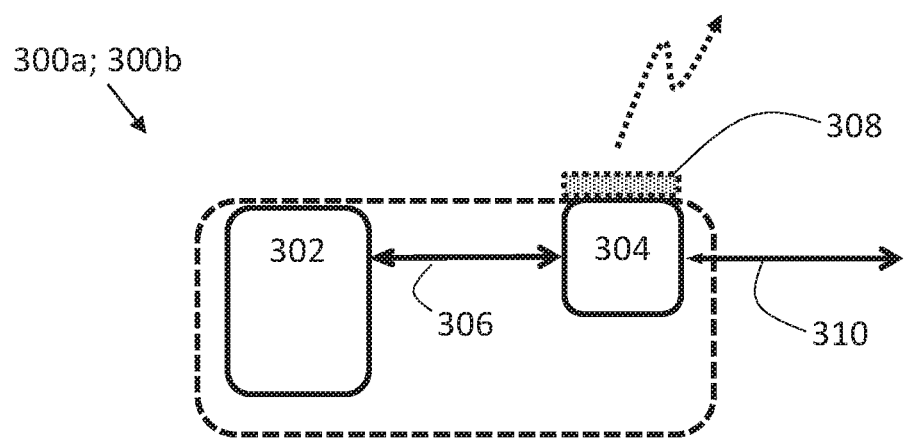
FIG. 3 shows a software provisioning server according to an embodiment of the invention.

The ARB exceptions may be preinstalled in the electronic device 100 in one example. However, the ARB exceptions may also be defined or determined by a central entity and distributed to electronic devices. According to an embodiment of the invention the definition and distribution of ARB exceptions are performed by a central server, such as a software provisioning server 300*a*; 300*b* as shown in FIG. 3. The software provisioning server 300*a*; 300*b* in this example comprises a processor 302 coupled to a transceiver 304. The processor 302 and the transceiver 304 are coupled to each other by means of optional communication means 306 known in the art. The software provisioning server 300*a*; 300*b* can be configured for both wireless and wired communications in wireless and wired communication systems, respectively. The wireless communication capability is provided with an antenna 308 coupled to the transceiver 304, while the wired communication capability is provided with a wired communication interface 310 coupled to the transceiver 304. The software provisioning server 300*a*; 300*b* may be a server coupled to the internet.

According to the present solution, the software provisioning server 300*a*; 300*b* is configured to determine an ARB exception associated with a SW for overrunning an ARB enforcement policy in an electronic device 100, e.g. the one shown in FIG. 1. The ARB exception comprises a signature of the ARB exception and a revision number RN of the SW. The software provisioning server 300*a*; 300*b* is further configured to provide or distribute the ARB exception to the electronic device 100.

Figure 4:
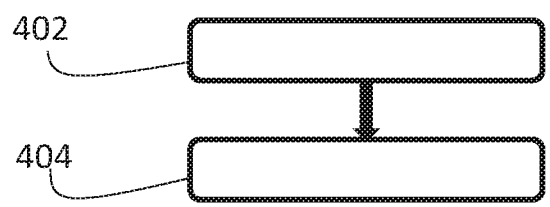
FIG. 4 shows a method for the software provisioning server according to an embodiment of the invention.

FIG. 4 shows a flow chart of a corresponding method 400 which may be executed in a software provisioning server 300*a*; 300*b*, such as the one shown in FIG. 3. The method 400 comprises determining 402 an ARB exception associated with a SW for overrunning a ARB enforcement policy in an electronic device 100. The ARB exception comprises a signature of the ARB exception and a revision number RN of the SW. The method 400 further comprises providing 404 the ARB exception to the electronic device 100.

There are several ways to provide or distribute an ARB exception to an electronic device 100. The ARB exception can be provided to the electronic device 100 along with the SW, i.e. included in the SW bundle, or in a separate step. If the ARB exception is provided in a separate step it can either be provided before or after the SW has been provided to the electronic device 100. The ARB exception should be available at the electronic device 100 when the electronic device wants to execute (install or run) the SW.

There are also different options related to how the ARB exception distribution is triggered. One option is to let the software provisioning server 300*a*; 300*b* initiate the distribution and thereby provide the ARB exception to the electronic device 100 on its own initiative, i.e. the ARB exception is pushed to the electronic device 100. This option would normally be used when the ARB exception is provided together with the SW or before the actual SW. Another option it to let the electronic device 100 trigger the distribution of the ARB exception by sending a request, i.e. the ARB exception is pulled by the electronic device 100. This option would e.g. make sense in a scenario where the electronic device 100 is trying to execute a SW but receives an error message due to a violation of an ARB enforcement policy. The electronic device 100 would then send a request to the software provisioning server 300*a*; 300*b* to find out if there is a valid ARB exception associated with the SW that would allow the electronic device 100 to overrun the ARB enforcement policy and execute the SW. This option will now be described in more detail with reference to FIG. 5.

Figure 5:
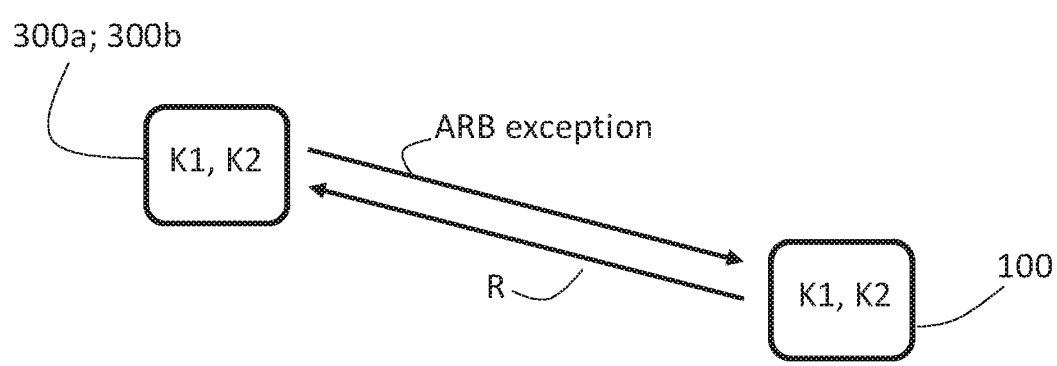
FIG. 5 shows signalling related to ARB exception in a communication system according to an embodiment of the invention.

FIG. 5 shows a communication system 500 according to an embodiment of the invention. The communication system 500 comprises an electronic device 100 and one or more software provisioning servers 300*a*; 300*b*. However, only one software provisioning server 300*a*; 300*b* is shown in FIG. 5. In FIG. 5 the electronic device 100 obtains the ARB exception by transmitting an ARB exception request R to the software provisioning server 300*a*; 300*b*. The ARB exception request R is received by the software provisioning server 300*a*; 300*b* which in response to said ARB exception request R transmits the ARB exception to the electronic device 100. The request R can e.g. be sent using any communication protocol known in the art.

In order to prevent attackers from exploiting ARB exceptions to overrun an ARB enforcement policy, the electronic device 100 ensures that the received ARB exception is valid, i.e. that it is obtained from a trusted party. In one embodiment of the invention the validation of the ARB exception is based on a signature scheme with one or more keys. The signature scheme could either use a symmetric key or an asymmetric key. If a symmetric key is used both parties share one and the same private key. One party signs the ARB exception using the private key and the other party validates the signature of the ARB exception using the same private key. An asymmetric key is based on a key pair comprising a private key and a public key. One party signs the ARB exception using the private key of the key pair and the other party validates the signature of the ARB exception using the public key of said key pair. Examples of asymmetric signature schemes that could be used are Rivest Shamir Adleman (RSA) cryptosystem, Digital Signature Algorithm (DSA), or Elliptic Curve DSA (ECDSA). Examples of symmetric signature schemes that could be used are key hash functions, such as Hash Message Authentication Code-Secure Hash Algorithm 256 (HMAC-SHA256).

The validation of an ARB exception in the communication system 500 shown in FIG. 5 will now be described. The software provisioning server 300*a*; 300*b* has determined an ARB exception and signs the ARB exception using a first key K1. The first key K1 can be a symmetric or an asymmetric key. The ARB exception is provided to the electronic device 100. The electronic device 100 obtains the ARB exception as well as the first key K1 associated with the signature of the ARB exception. Based on the obtained signature and the obtained first key K1 the electronic device 100 validates the signature and thereby the ARB exception. If the ARB exception is found to be valid the electronic device 100 installs or runs the SW so as to execute the SW with the revision number RN comprised in the ARB exception. If the ARB exception is found to be not valid the electronic device 100 block the execution of the software.

The validation described above validates the provider of the ARB exception, i.e. in one embodiment the software provisioning server 300*a*; 300*b*, and ensures that the ARB exception is provided by a trusted party. In order to increase the security an additional validation of the SW can be performed, using a corresponding signature scheme. By validating the SW it is possible to control which parties are allowed to create SW installation packages, e.g. only allow certain trusted parties to create such installation packages. In the embodiment in FIG. 5 the key used to validate the SW is referred to as a second key K2. The second key K2 can be either a symmetric key or an asymmetric key and is used by the software provisioning server 300*a*; 300*b* to sign the SW. Both the signature of the SW and the second key K2 are provided to the electronic device 100 and used by the electronic device 100 to validate the SW. In this scenario, the electronic device 100 will only execute the SW and thereby overrun the ARB enforcement policy if both the signature of the ARB exception and the signature of the SW is valid.

The first key K1 and the second key K2 may be obtained by the electronic device 100 in different ways. One option is that at least one of the first and the second keys K1, K2 are preinstalled in the electronic device 100. Another option is that at least one of the first and the second keys K1, K2 is provided to the electronic device 100 from another party, e.g. provided from a trusted party such as the software provisioning server 300*a*; 300*b*.

In the embodiments described so far the ARB exception is provided to the electronic device 100 directly from the trusted party issuing the ARB exception. However, other scenarios in which the ARB exceptions are delegated between trusted parties are also possible. In such a scenario, a trusted party signs a ARB exception that allows a partner trusted party to determine its own ARB exception which in turn is provided to and validated by an electronic device 100. The delegate scenario is shown in FIG. 6.

Figure 6:
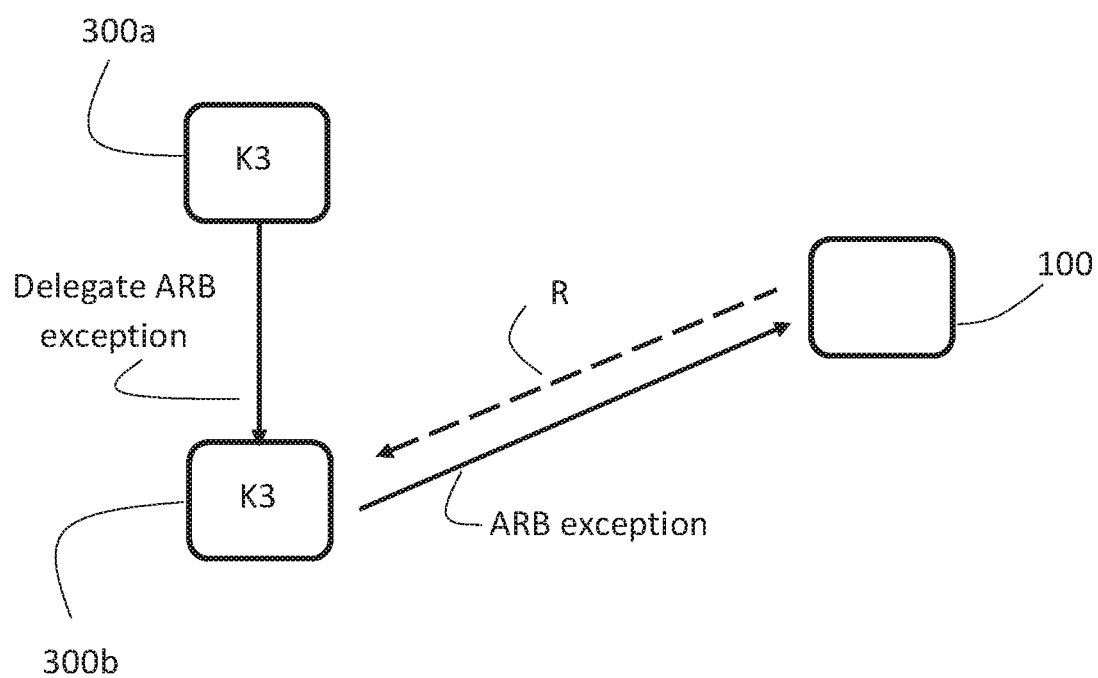
FIG. 6 shows signalling related to delegate ARB exception according to an embodiment of the invention.

In FIG. 6 the software provisioning server 300*a* acts as a root trusted party and determines a delegate ARB exception associated with a SW. The delegate ARB exception comprises a signature of the delegate ARB exception, a delegate policy for ARB exception, and a revision number RN of the software SW. With the delegate policy the root trusted party gives permission to a delegate party to determine ARB exceptions based on the delegate ARB exception. The delegate policy further defines what kind of ARB exceptions the delegate party is allowed to determine. In the example shown in FIG. 6 the software provisioning server 300*a* transmits the delegate ARB exception to the delegate party, i.e. the other software provisioning server 300*b*. When the software provisioning server 300*b* receives the delegate ARB exception the software provisioning server 300*b* checks the validity of the signature of the delegate ARB exception, e.g. using one of the earlier described signature schemes. If the signature of the delegate ARB exception is valid the software provisioning server 300*b* determines an ARB exception associated with the SW based on the delegate policy for ARB exception and the revision number RN of the software SW. The software provisioning server 300*b* then provides the determined ARB exception to the electronic device 100 either directly or upon a request R from the electronic device 100, as described earlier with reference to FIG. 5.

The validation of the delegate ARB exception by the delegate party may be based on a third key K3 associated with the root trusted party. In the embodiment describes above, the software provisioning server 300*b* can check the validity of the signature of the delegate ARB exception using the third key K3 associated with the delegate ARB exception from the software provisioning server 300*a*. The third key K3 may be preinstalled in the software provisioning server 300*b* or received from another party, e.g. the software provisioning server 300*a* acting as a root trusted party.

When the electronic device 100 receives an ARB exception from a delegate party, the ARB exception is validated using one of the earlier described signature schemes, i.e. based on the signature of the ARB exception and an obtained key associated with the signature of the ARB exception.

In the delegate case an additional check of the ARB exception from the delegate party against the ARB exception from the root trusted party may be performed by the electronic device 100. The additional check is performed to make sure that the ARB exception from the delegate party does not contradict the ARB exception from the root trusted party. For example, that the ARB exception from the delegate party does not comprise a revision number of the SW which is lower than the revision number of the SW in the ARB exception from the root trusted party.

Furthermore, any method according to embodiments of the invention may be implemented in a computer program, having code means, which when run by processing means causes the processing means to execute the steps of the method. The computer program is included in a computer readable medium of a computer program product. The computer readable medium may comprises essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the electronic device 100 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors 102 and 302 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. An electronic device comprising:
    a processor, and
    a memory coupled to the processor and having processor-executable instructions stored thereon, which when executed cause the processor to implement operations including:
        obeying, by the electronic device, an anti-roll back (ARB) enforcement policy from a software provisioning server;
        transmitting, by the electronic device, an ARB exception request to the software provisioning server;
        in response to the transmission of the ARB exception request to the software provisioning server, receiving, by the electronic device, an ARB exception associated with software for overrunning the ARB enforcement policy of the electronic device,
            wherein the ARB exception comprises a signature of the ARB exception and a revision number of the software and provides a controlled and secure roll back based on the revision number and the signature of the ARB exception,
            wherein the ARB exception is based on a signature-validated delegate ARB exception associated with the software, the signature-validated delegate ARB exception being associated with a delegate-ARB-exception-transmitting software provisioning server and the software provisioning server,
            wherein the delegate ARB exception comprises a signature of the delegate ARB exception, a delegate policy for the ARB exception, and the revision number of the software, and
            wherein the ARB exception associated with the software is based on the delegate policy and the revision number of the software;
        checking, by the electronic device, validity of the signature of the ARB exception; and
        executing, by the electronic device, the software having the revision number so as to overrun the ARB enforcement policy when the signature of the ARB exception is valid.

2. The electronic device according to claim 1, wherein the ARB exception further comprises an identity of the software, and wherein the processor is configured to
    identify the software having the revision number to be executed based on the identity of the software.

3. The electronic device according to claim 1, wherein the revision number is a minimum revision number, and wherein the processor is configured to
    execute the software having the minimum revision number or a higher revision number when the signature of the ARB exception is valid.

4. The electronic device according to claim 1, wherein the processor is configured to:
    obtain a first key associated with the signature of the ARB exception; and
    check the validity of the signature of the ARB exception using the first key.

5. The electronic device according to claim 1, wherein the ARB exception further comprises a second key associated with the software, and wherein the processor is configured to:
    check the validity of the signature of the software using the second key; and
    execute the software having the revision number so as to overrun the ARB enforcement policy when the signature of the ARB exception is valid and the signature of the software is valid.

6. The electronic device according to claim 1, wherein the revision number is a lower revision number than a current revision number of the software already installed in the electronic device.

7. The electronic device according to claim 1, wherein the processor is configured to install or run the software so as to execute the software having the revision number.

8. The electronic device according to claim 1, further comprising a transceiver configured to cooperate with the processor to:
    transmit the ARB exception request associated with the software to the software provisioning server; and
    receive the ARB exception from the software provisioning server in response to the transmission of the ARB exception request to the software provisioning server.

9. The electronic device according to claim 1, further comprising a transceiver configured to cooperate with the processor to receive the ARB exception in a software bundle comprising the software.

10. A software provisioning server comprising:
    a processor and a transceiver configured to cooperate and provide at least the following operations:
        receive a delegate anti-roll back (ARB) exception associated with software from a second software provisioning server,
            wherein the delegate ARB exception comprises a signature of the delegate ARB exception, a delegate policy for an ARB exception, and a revision number of the software,
        check a validity of the signature of the delegate ARB exception associated with the software from the second software provisioning server;
        in response to determining the signature is valid, determine the ARB exception associated with the software based on the delegate policy and the revision number of the software,
            wherein the ARB exception is for overrunning an ARB enforcement policy in an electronic device, and wherein the ARB exception comprises a signature of the ARB exception and the revision number of the software; and provide the ARB exception to the electronic device.

11. The software provisioning server according to claim 10, wherein the processor is further configured to determine a second delegate ARB exception associated with the software, wherein the second delegate ARB exception comprises a second signature of the second delegate ARB exception, a second delegate policy for the ARB exception, and a second revision number of the software; and the transceiver is configured to cooperate with the processor to transmit the delegate ARB exception to another software provisioning server.

12. The software provisioning server according to claim 10, wherein the transceiver is further configured to cooperate with the processor to receive a third key associated with the delegate ARB exception from the second software provisioning server; and the processor is further configured to check the validity of the signature of the delegate ARB exception using the third key.

13. The software provisioning server according to claim 10, wherein the transceiver is further configured to cooperate with the processor to:

receive an ARB exception request associated with the software from the electronic device; and transmit the ARB exception to the electronic device in response to the reception of the ARB exception request from the electronic device.

14. A method applied to an electronic device, the method comprising:

obeying, by the electronic device, an anti-roll back (ARB) enforcement policy from a software provisioning server;

transmitting, by the electronic device, an ARB exception request to the software provisioning server;

in response to the transmission of the ARB exception request to the software provisioning server, receiving, by the electronic device, an ARB exception associated with software for overrunning the ARB enforcement policy of the electronic device, wherein the ARB exception comprises a signature of the ARB exception and a revision number of the software and provides a controlled and secure roll back based on the revision number and the signature of the ARB exception, wherein the ARB exception is based on a signature-validated delegate ARB exception associated with the software, the signature-validated delegate ARB exception being associated with a delegate-ARB-exception-transmitting software provisioning server and the software provisioning server, wherein the delegate ARB exception comprises a signature of the delegate ARB exception, a delegate policy for the ARB exception, and the revision number of the software, and wherein the ARB exception associated with the software is based on the delegate policy and the revision number of the software;

checking, by the electronic device, validity of the signature of the ARB exception; and executing, by the electronic device, the software having the revision number so as to overrun the ARB enforcement policy when the signature of the ARB exception is valid.

15. A method applied to a software provisioning server, the method comprising:

receiving a delegate anti-roll back (ARB) exception associated with software from a second software provisioning server, wherein the delegate ARB exception comprises a signature of the delegate ARB exception, a delegate policy for an ARB exception, and a revision number of the software;

checking a validity of the signature of the delegate ARB exception associated with the software from the second software provisioning server;

in response to determining the signature is valid, determining the ARB exception associated with the software based on the delegate policy and the revision number of the software, wherein the ARB exception is for overrunning an ARB enforcement policy in an electronic device, and wherein the ARB exception comprises a signature of the ARB exception and the revision number of the software; and providing the ARB exception to the electronic device.

16. A non-transitory computer-readable medium, having processor-executable instructions stored thereon, which when executed by a processor of a computer cause the computer to perform the method according to claim 15.

17. The method according to claim 14, wherein the ARB exception further comprises an identity of the software, and wherein the method further comprises identifying the software having the revision number to be executed based on the identity of the software.

18. The method according to claim 14, wherein the revision number is a minimum revision number, and wherein the method further comprises:

executing the software having the minimum revision number or a higher revision number when the signature of the ARB exception is valid.

19. The method according to claim 15, further comprising:

determining a second delegate ARB exception associated with the software, wherein the second delegate ARB exception comprises a second signature of a second delegate ARB exception, a second delegate policy for the ARB exception, and a second revision number of the software; and transmitting the second delegate ARB exception to another software provisioning server.

20. The method according to claim 15, including receiving a third key associated with the delegate ARB exception from the second software provisioning server, and checking the validity of the signature of the delegate ARB exception using the third key.

* * * * *

UNITED STATES PATENT AND TRADEMARK OFFICE
CERTIFICATE OF CORRECTION

| | |
|---|---|
| PATENT NO. | : 11,455,399 B2 |
| APPLICATION NO. | : 16/415939 |
| DATED | : September 27, 2022 |
| INVENTOR(S) | : Hirvimies et al. |

It is certified that error appears in the above-identified patent and that said Letters Patent is hereby corrected as shown below:

In the Claims

Claim 15: Column 16, Line 11: "ing server," should read -- ing server; --.

Signed and Sealed this
Thirteenth Day of June, 2023

Katherine Kelly Vidal
*Director of the United States Patent and Trademark Office*